(12) United States Patent
Kupratis et al.

(10) Patent No.: US 12,312,966 B1
(45) Date of Patent: May 27, 2025

(54) GAS TURBINE ENGINE WITH HYBRID FAN EXIT GUIDE VANES

(71) Applicant: RTX Corporation, Farmington, CT (US)

(72) Inventors: Daniel Kupratis, Wallingford, CT (US); Dmitriy Sidelkovskiy, Ellington, CT (US); Flavien Thomas, Suamico, WI (US); Michael Winter, New Haven, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/734,531

(22) Filed: Jun. 5, 2024

(51) Int. Cl.
| | |
|---|---|
| *F01D 17/16* | (2006.01) |
| *F02K 3/06* | (2006.01) |
| *F04D 27/00* | (2006.01) |
| *F04D 27/02* | (2006.01) |
| *F04D 29/54* | (2006.01) |
| *F04D 29/56* | (2006.01) |

(52) U.S. Cl.
CPC .............. *F01D 17/162* (2013.01); *F02K 3/06* (2013.01); *F04D 27/002* (2013.01); *F04D 27/0246* (2013.01); *F04D 29/542* (2013.01); *F04D 29/563* (2013.01); *F05D 2220/36* (2013.01); *F05D 2240/12* (2013.01)

(58) Field of Classification Search
CPC ........ F01D 17/162; F02K 3/06; F04D 27/002; F04D 27/0246; F04D 29/542; F04D 29/563; F05D 2220/36; F05D 2240/12
See application file for complete search history.

(56) References Cited

U.S. PATENT DOCUMENTS

| | | | | |
|---|---|---|---|---|
| 3,861,822 A | * | 1/1975 | Wanger ................. | F04D 29/563 415/162 |
| 4,288,983 A | * | 9/1981 | O'Rourke, Jr. ........... | F02K 3/06 60/262 |
| 5,259,187 A | * | 11/1993 | Dunbar ..................... | F02K 3/06 60/226.3 |
| 5,794,432 A | * | 8/1998 | Dunbar .................. | F04D 27/02 60/226.1 |
| 5,993,152 A | * | 11/1999 | Schilling ............... | F01D 17/162 415/155 |
| 7,730,714 B2 | | 6/2010 | Wood et al. | |
| 8,011,882 B2 | | 9/2011 | McMillan | |
| 8,347,633 B2 | | 1/2013 | Smith et al. | |

(Continued)

*Primary Examiner* — Brian Christopher Delrue
(74) *Attorney, Agent, or Firm* — Bachman & LaPointe, P.C.

(57) ABSTRACT

A gas turbine engine with hybrid fan exit guide vanes including a fan duct supporting a circumferential pattern of split variable fan exit guide vanes, the split variable fan exit guide vanes comprising an upper section and a lower section, the upper section and the lower section each being adjustable about an axis extending along a span of each of the split variable fan exit guide vanes; an upper actuator in operative communication with the upper section, the upper actuator configured to independently adjust an incidence angle of the upper section responsive to predetermined gas turbine operating conditions; and a lower actuator in operative communication with the lower section, the lower actuator configured to independently adjust an incidence angle of the lower section responsive to the predetermined gas turbine operating conditions.

20 Claims, 4 Drawing Sheets

(56) References Cited

U.S. PATENT DOCUMENTS

| | | | |
|---|---|---|---|
| 10,125,622 B2* | 11/2018 | Rice | F02C 9/20 |
| 10,174,763 B1* | 1/2019 | Orosa | F01D 5/146 |
| 10,450,879 B2 | 10/2019 | Di Mare et al. | |
| 11,555,502 B1* | 1/2023 | Sishtla | F04D 27/0246 |
| 11,802,490 B2* | 10/2023 | Hall | F01D 7/02 |
| 11,879,343 B2* | 1/2024 | Hall | F01D 17/162 |
| 2005/0147492 A1* | 7/2005 | Mahoney | F04D 27/0246 |
| | | | 415/148 |
| 2013/0276425 A1* | 10/2013 | Rittenhouse | F04D 29/563 |
| | | | 60/39.091 |
| 2014/0075956 A1* | 3/2014 | Patsouris | F02C 6/08 |
| | | | 60/785 |
| 2016/0069275 A1* | 3/2016 | Lecordix | F02C 9/22 |
| | | | 415/146 |
| 2016/0376918 A1* | 12/2016 | Swann | F01D 15/10 |
| | | | 60/772 |
| 2018/0089361 A1* | 3/2018 | Guo | G06F 30/17 |
| 2020/0191004 A1* | 6/2020 | Prasad | F01D 17/16 |
| 2023/0060832 A1* | 3/2023 | Hall | F01D 17/162 |
| 2024/0309773 A1* | 9/2024 | Heeter | F01D 17/00 |
| 2024/0309774 A1* | 9/2024 | Molnar, Jr. | F01D 17/162 |
| 2024/0309775 A1* | 9/2024 | Molnar, Jr. | F01D 9/041 |

* cited by examiner

GAS TURBINE ENGINE WITH HYBRID FAN EXIT GUIDE VANES

BACKGROUND

The present disclosure is directed to the improved gas turbine engine with hybrid fan exit guide vanes.

Current gas turbine engine design, as seen in FIG. 1 through FIG. 4, includes a design with non-variable fan exit guide vanes (FEGV). The fan F is positioned within the fan duct FD proximate the engine inlet EI. The fan exit guide vanes FEGV are downstream from the fan F and located forward of the bypass duct BD.

A current FEGV pattern is created to minimize airflow back pressure adverse effect on fan blades F caused by the downstream presence of nacelle N bypass duct BD elements (FIG. 2), such as the upper and lower bifurcation BiFi, air-to-oil cooler cowl AOC, and environmental control system inlet ECS.

Figure 1:
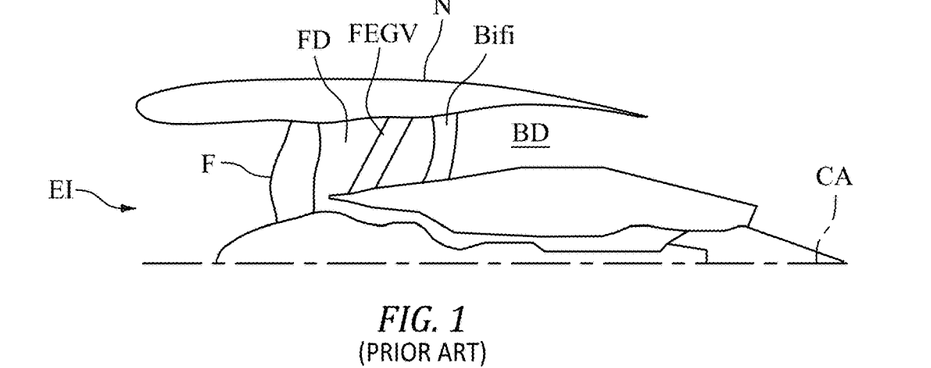
FIG. 1 is a schematic representation of a prior art gas turbine engine.
Figure 2:
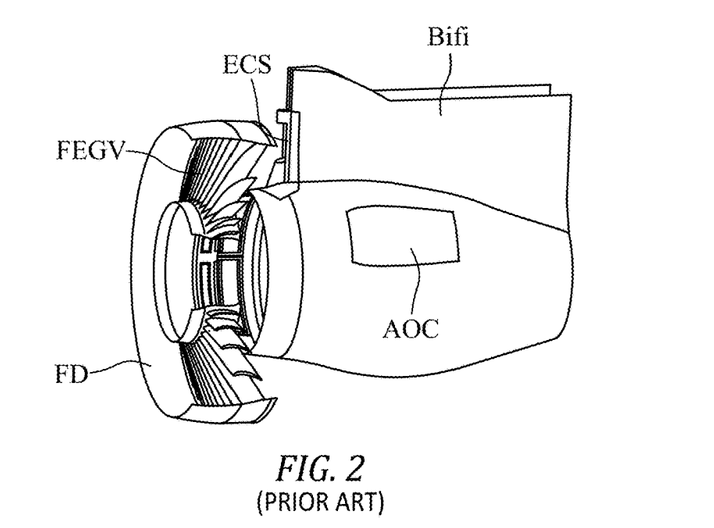
FIG. 2 is a schematic representation of a prior art gas turbine engine.
Figure 3:
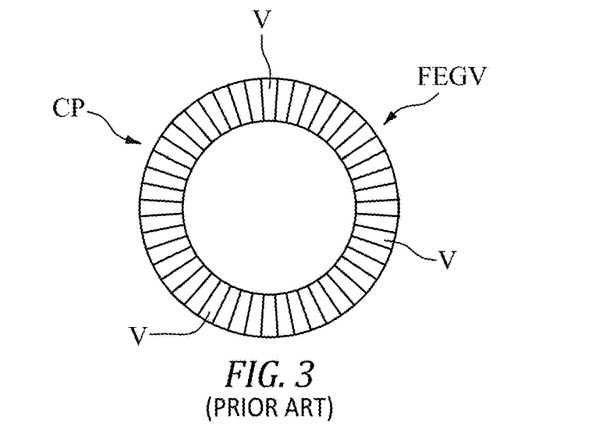
FIG. 3 is a schematic representation of a prior art fan exit guide vane pattern.
Figure 4:
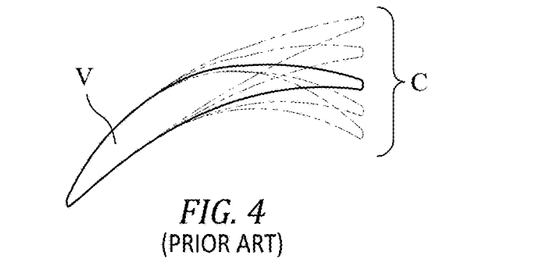
FIG. 4 is a schematic representation of a prior art fan exit guide vane camber variation.

As seen in FIG. 3, the FEGV has a circumferential pattern CP made up of vanes V of different cambers C (FIG. 4) and trailing edge angles. But all vane types are designed with the same fixed installation angles, and with about the same leading-edge incident angles. The vanes are not adjustable after installation during engine operation. Additionally, the FEGV pattern aims to optimize the fan duct performance and acoustic characteristics of the gas turbine engine.

The FEGV pattern is defined to meet structural, performance and acoustic requirements across a wide range of operating conditions. It is therefore not optimized at any mission single condition, like cruise condition and climb condition.

SUMMARY

In accordance with the present disclosure, there is provided a gas turbine engine with hybrid fan exit guide vanes comprising a fan duct supporting a circumferential pattern of hybrid fan exit guide vanes supported within the fan duct downstream from the fan, the hybrid fan exit guide vanes comprising at least one of a fixed fan exit guide vane, a variable fan exit guide vane and a split variable fan exit guide vane, the split variable fan exit guide vanes comprising an upper section and a lower section, the upper section and the lower section each being adjustable about an axis extending along a span of each of the split variable fan exit guide vanes; an upper actuator in operative communication with the upper section, the upper actuator configured to independently adjust an incidence angle of the upper section responsive to predetermined gas turbine operating conditions; a lower actuator in operative communication with the lower section, the lower actuator configured to independently adjust an incidence angle of the lower section responsive to the predetermined gas turbine operating conditions; and one of the upper actuator or the lower actuator in operative communication with the variable fan exit guide vane.

A further embodiment of any of the foregoing embodiments may additionally and/or alternatively include the upper actuator is configured to adjust an installation angle of the upper section from an original predetermined value to another value for each associated split variable fan exit guide vane; and the lower actuator is configured to adjust an installation angle of the lower section from an original predetermined value to another value for each associated split variable fan exit guide vane; and either of the upper actuator or the lower actuator being configured to adjust an installation angle of the variable fan exit guide vane from an original predetermined value to another value for each associated variable fan exit guide vane.

A further embodiment of any of the foregoing embodiments may additionally and/or alternatively include each of the split variable fan exit guide vanes are divided between the span extending between fan duct walls supporting the split variable fan exit guide vanes; and wherein each of the variable fan exit guide vanes is contiguous along the span extending between fan duct walls supporting the variable fan exit guide vanes.

A further embodiment of any of the foregoing embodiments may additionally and/or alternatively include each of the individual split variable fan exit guide vanes and each of the variable fan exit guide vanes are configured individually adjustable during operation of the gas turbine engine operation.

A further embodiment of any of the foregoing embodiments may additionally and/or alternatively include the gas turbine engine with hybrid fan exit guide vanes further comprising a controller in operative communication with each of the upper actuator and the lower actuator.

A further embodiment of any of the foregoing embodiments may additionally and/or alternatively include each of the split variable fan exit guide vanes and the variable fan exit guide vanes are configured adjustable throughout the circumferential pattern.

A further embodiment of any of the foregoing embodiments may additionally and/or alternatively include each of the split variable fan exit guide vanes and the variable fan exit guide vanes are at least one of adjusted to direct an exit airflow away from a downstream object and adjusted to direct exit airflow toward a downstream object.

In accordance with the present disclosure, there is provided a gas turbine engine with hybrid fan exit guide vanes comprising a fan located within a fan duct; a circumferential pattern of hybrid fan exit guide vanes supported within the fan duct downstream from the fan, the hybrid fan exit guide vanes comprising at least one of a fixed fan exit guide vane, a variable fan exit guide vane; and a split variable fan exit guide vane comprising an upper section and a lower section, the upper section and the lower section each being adjustable about an axis extending between a span of each of the split variable fan exit guide vanes; an upper actuator in operative communication with the upper section, the upper actuator configured to independently adjust an incidence angle of the upper section responsive to predetermined gas turbine operating conditions; a lower actuator in operative communication with the lower section, the lower actuator configured to independently adjust an incidence angle of the lower section responsive to the predetermined gas turbine operating conditions; and one of the upper actuator or the lower actuator in operative communication with the variable vane; and a controller in operative communication with the upper actuator and/or the lower actuator.

A further embodiment of any of the foregoing embodiments may additionally and/or alternatively include the upper actuator is configured to adjust an installation angle of the upper section from an original predetermined value to another value for each associated split variable fan exit guide vane; and the lower actuator is configured to adjust an installation angle of the lower section from an original predetermined value to another value for an associated split variable fan exit guide vane; and either of the upper actuator or the lower actuator being configured to adjust an installation angle of the variable fan exit guide vane from an original predetermined value to another value for each associated variable fan exit guide vane.

A further embodiment of any of the foregoing embodiments may additionally and/or alternatively include each of the split variable fan exit guide vanes are divided between the span extending between fan duct walls supporting the split variable fan exit guide vanes; and wherein each of the variable fan exit guide vanes is contiguous along the span extending between fan duct walls supporting the variable fan exit guide vanes.

A further embodiment of any of the foregoing embodiments may additionally and/or alternatively include each of the individual split variable fan exit guide vanes and/or the variable fan exit guide vanes are configured individually adjustable during operation of the gas turbine engine operation.

A further embodiment of any of the foregoing embodiments may additionally and/or alternatively include each of the split variable fan exit guide vanes and/or the variable fan exit guide vanes are configured adjustable throughout the circumferential pattern.

A further embodiment of any of the foregoing embodiments may additionally and/or alternatively include each of the upper section and lower section of the split variable fan exit guide vanes and the variable fan exit guide vanes can be at least one of adjusted to direct an exit airflow away from a downstream object and adjusted to direct exit airflow toward a downstream object.

In accordance with the present disclosure, there is provided a process for a gas turbine engine with hybrid fan exit guide vanes comprising supporting a circumferential pattern of hybrid fan exit guide vanes supported within the fan duct downstream from the fan, the hybrid fan exit guide vanes comprising at least one of a fixed fan exit guide vane, a variable fan exit guide vane and a split variable fan exit guide vane in a fan duct, the split variable fan exit guide vanes comprising an upper section and a lower section; configuring the upper section and the lower section adjustable about an axis extending between a span of each of the split variable fan exit guide vanes; and coupling an upper actuator in operative communication with the upper section; configuring the upper actuator to independently adjust an incidence angle of the upper section responsive to predetermined gas turbine operating conditions; coupling a lower actuator in operative communication with the lower section; configuring the lower actuator to independently adjust an incidence angle of the lower section responsive to the predetermined gas turbine operating conditions; and configuring one of the upper actuator or the lower actuator in operative communication with the variable fan exit guide vane.

A further embodiment of any of the foregoing embodiments may additionally and/or alternatively include the process further comprising configuring the upper actuator to adjust an installation angle of the upper section from an original predetermined value to another value for each associated split variable fan exit guide vanes; configuring the lower actuator to adjust an installation angle of the lower section from an original predetermined value to another value for each associated split variable fan exit guide vane; and configuring at least one of the upper actuator and the lower actuator to adjust an installation angle of the variable fan exit guide vane from an original predetermined value to another value for each associated variable fan exit guide vane.

A further embodiment of any of the foregoing embodiments may additionally and/or alternatively include the process further comprising configuring each of the split variable fan exit guide vanes into separate portions between a span extending between fan duct walls supporting the split variable fan exit guide vanes.

A further embodiment of any of the foregoing embodiments may additionally and/or alternatively include the process further comprising configuring each of the individual variable fan exit guide vanes and the split variable fan exit guide vanes individually adjustable during operation of the gas turbine engine operation.

A further embodiment of any of the foregoing embodiments may additionally and/or alternatively include the process further comprising coupling a controller in operative communication with each of the upper actuator and the lower actuator.

A further embodiment of any of the foregoing embodiments may additionally and/or alternatively include the process further comprising configuring each of the variable fan exit guide vanes and the split variable fan exit guide vanes adjustable throughout the entire circumferential pattern.

A further embodiment of any of the foregoing embodiments may additionally and/or alternatively include the process further comprising configuring each of the upper section and lower section of the split variable fan exit guide vanes and each variable fan exit guide vane at least one of adjusted to direct an exit airflow away from a downstream object and adjusted to direct exit airflow toward a downstream object.

Other details of the gas turbine engine with hybrid fan exit guide vanes are set forth in the following detailed description and the accompanying drawings wherein like reference numerals depict like elements.

DETAILED DESCRIPTION

Figure 5:
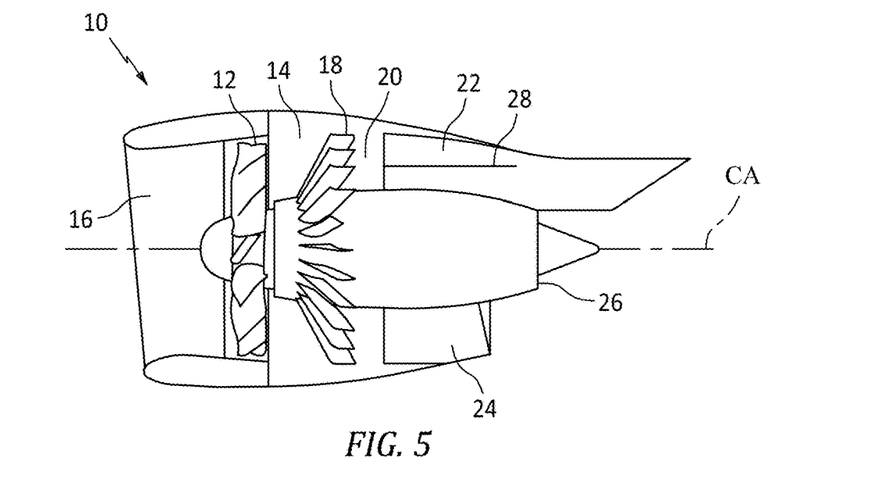
FIG. 5 is a schematic representation of an exemplary gas turbine engine with hybrid fan exit guide vanes.
Figure 6:
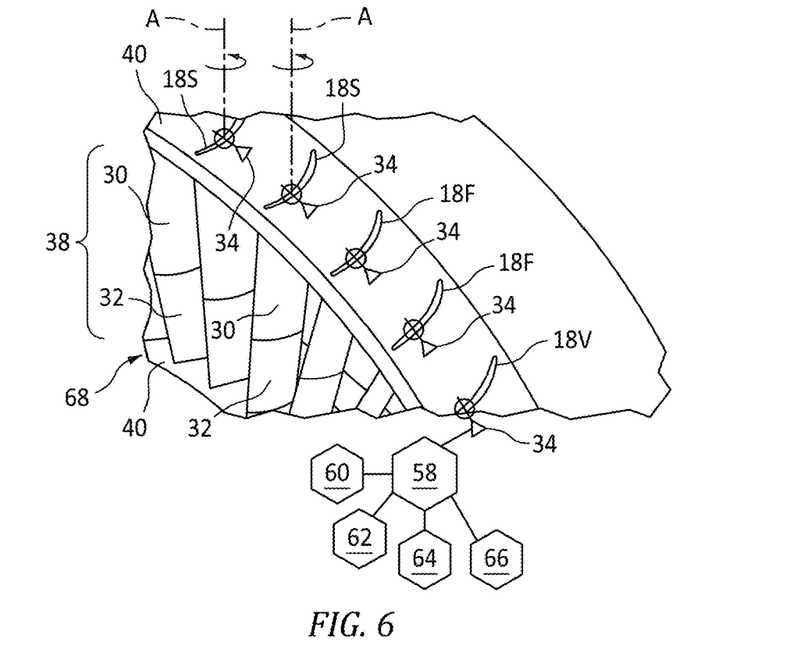
FIG. 6 is a perspective view schematic representation of exemplary hybrid fan exit guide vanes.

Referring now to FIG. 5 and FIG. 6, there is illustrated an exemplary gas turbine engine 10. The gas turbine engine 10 includes a fan 12 within a fan duct 14 proximate an engine inlet 16. Downstream from the fan 12 are an array of hybrid fan exit guide vanes 18 upstream from a bypass duct 20. An upper and lower bifurcation 22, 24 are shown downstream from the hybrid fan exit guide vanes 18. A core exit 26 is shown downstream from the bifurcations 22, 24. The hybrid fan exit guide vanes 18 can include three varieties of fan exit guide vanes 18. A fixed fan exit guide vane 18F includes a fan exit guide vane 18F that is fixed and does not rotate during engine operation. A variable fan exit guide vane 18V is not fixed and can rotate and adjust during engine operation. A split variable fan exit guide vane 18S is not fixed and includes multiple sections along the span that can rotate independently about the same axis.

A splitter 28 is shown downstream from the hybrid fan exit guide vanes 18. The splitter 28 divides the bypass duct 20. The circumferential splitter 28 can be installed with the hybrid fan exit guide vanes 18. The splitter 28 can divide the split variable fan exit guide vanes 18S into sections, a top section 30 and a bottom section 32, each of the sections 30, 32 can be controlled independently in flight. It is contemplated that multiple splitters 28 can be employed, which divide each split variable fan exit guide vanes 18S for more than two parts along vane span 38.

Figure 7:
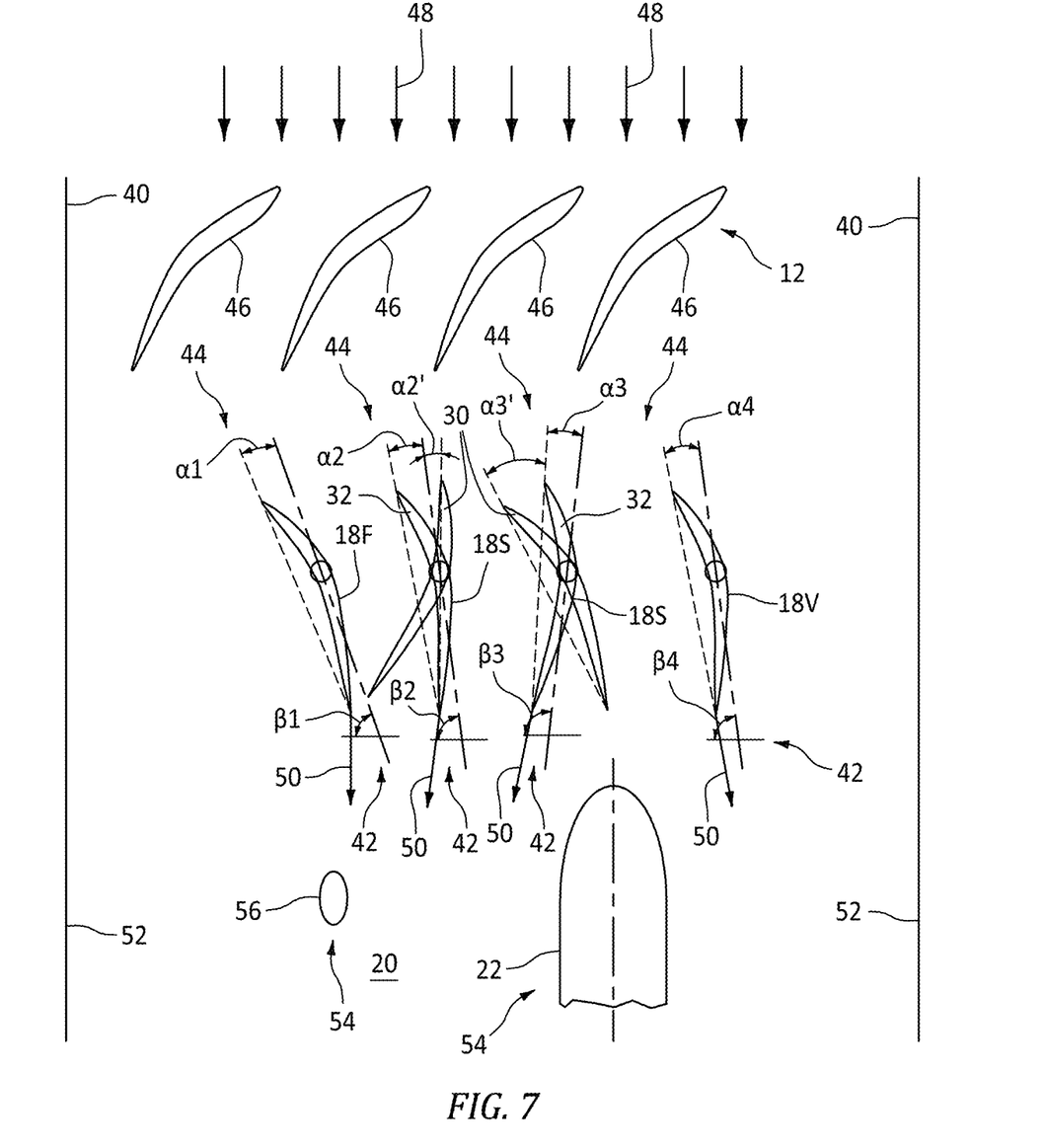
FIG. 7 is a plan view schematic representation of exemplary hybrid fan exit guide vanes.
Figure 9:
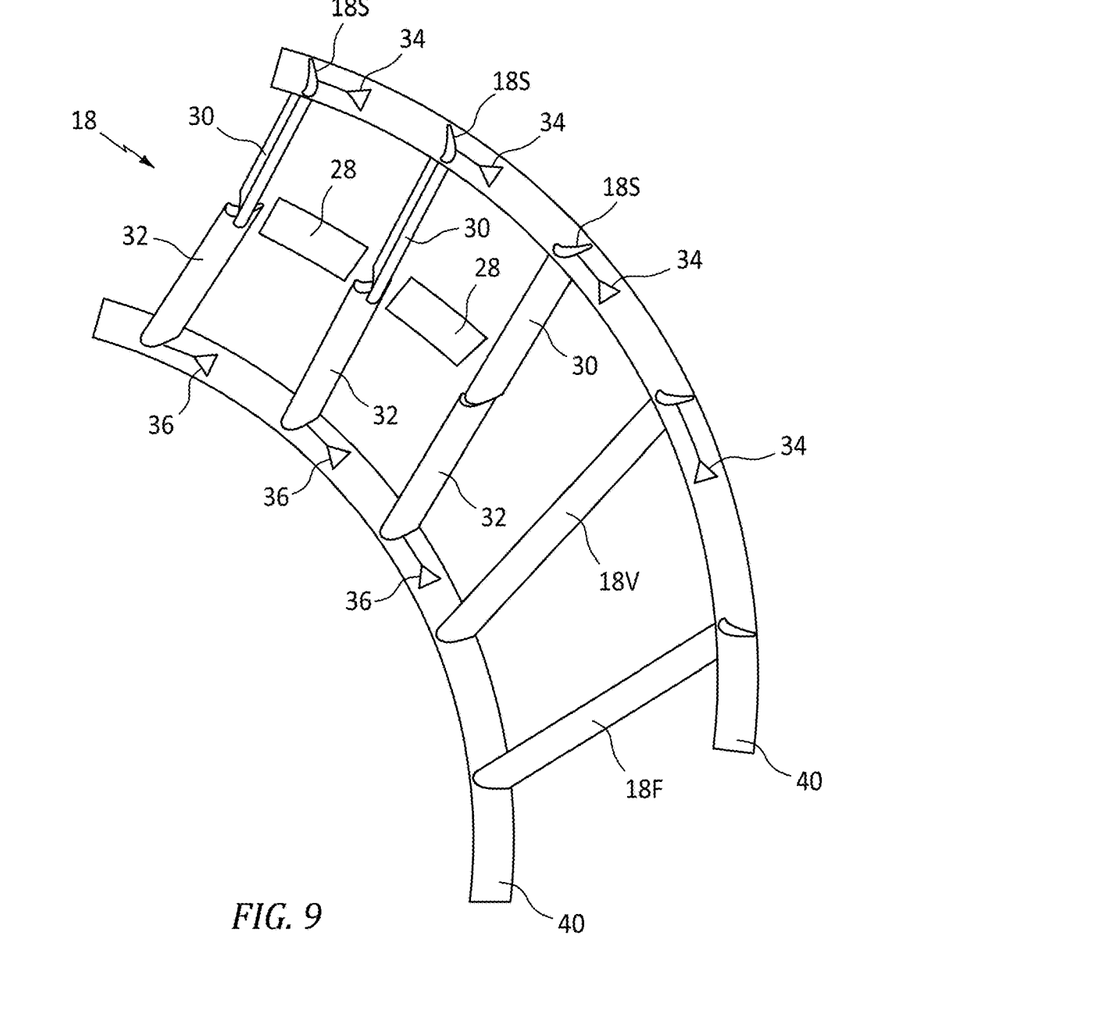
FIG. 9 is a perspective view schematic representation of exemplary hybrid fan exit guide vanes.

Also referring to FIG. 6 and FIG. 7, the split variable fan exit guide vanes 18S can be seen. The split variable fan exit guide vanes 18S include upper section 30 and lower section 32. The upper section 30 is radially distal from the lower section 32 relative to the central axis CA of the gas turbine engine 10. The upper section 30 and lower section 32 can pivot around an axis A. the axis A extends radially from the central axis CA. Each of the upper section 30 and lower section 32 can rotate independently. The upper section 30 and the lower section can also be rotated in unison. The split variable fan exit guide vanes 18S are shown from a perspective view in FIG. 6 and FIG. 9 with an upper actuator 34 in operative communication with each upper section 30 of each split variable fan exit guide vane 18S. A lower actuator 36 is shown at FIG. 9 in operative communication with each lower section 32 of each split variable fan exit guide vane 18S. The actuator 28 can be configured to move each split variable fan exit guide vane 18S.

Figure 8:
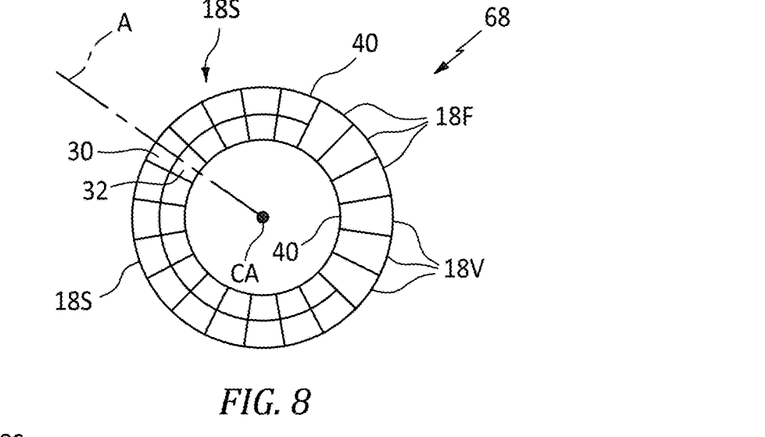
FIG. 8 is an axial end view schematic representation of exemplary hybrid fan exit guide vanes.

Also referring to FIG. 8 and FIG. 9, in an exemplary embodiment, there can be grouped actuators 34, 36 paired with each split variable fan exit guide vane 18S. There can be groups of split variable fan exit guide vanes 18S paired with the upper actuator 34 and the lower actuator 36. The split variable fan exit guide vane 18S can pivot around the axis A as shown in FIG. 6. The split variable fan exit guide vane 18S is not contiguous along the entire span 38 extending between the fan duct walls 40. The split variable fan exit guide vane 18S is divided into at least two portions, such as the upper section 30 and the lower section 32. Each individual split variable fan exit guide vane 18S can be adjusted individually. Each of the upper section 30 and the lower section 32 can be adjusted individually. The actuators 34 and 36 can adjust an installation angle 42 from the original predetermined value to another installation angle value. The actuators 34 and 36 can adjust the incidence angle 44 of the split variable fan exit guide vane 18 during operation of the gas turbine engine 10.

FIG. 6 also shows the fixed fan exit guide vane 18F. The fixed fan exit guide vane 18F does not rotate during engine operation. The variable fan exit guide vane 18V is also shown in FIG. 6. The variable fan exit guide vane 18V can be rotated by an actuator 34 during engine operation. The variable fan exit guide vane 18V is not divided along the span 38.

As seen in FIG. 7 and FIG. 9, each individual fan exit guide vane 18S upper section 30 and/or lower section 32 can be adjusted to a different incidence angle 44 (demarked alpha and alpha prime). The individual fan blades 46 are shown as part of the fan 12 in between the fan duct walls 40. Inlet air 48 is shown as flow arrows entering the fan 12. The incidence angles 44 can be varied from one split variable fan exit guide vane 18S to the next, as well as between the upper section 30 and/or lower section 32. The fixed fan exit guide vane 18F is also shown. The variable fan exit guide vane 18V is also shown with the actuator 34 in operative communication with the variable fan exit guide vane 18V.

The split variable fan exit guide vane 18S can include the installation pattern angle 42 (demarked beta). The installation pattern angle 42 can also be set differently from one split variable fan exit guide vane 18S to the other. As can be seen in FIG. 7, the split variable fan exit guide vane 18S exit airflow 50 is shown by arrows. The airflow 50 is shown to be adjusted based on the influence of the downstream bifurcation 22 in the bypass duct 20 bounded by the bypass duct wall 52. In an exemplary embodiment, a portion of the split variable fan exit guide vanes 18S can be adjusted to direct exit airflow 50 away from a downstream object 54, such as the bifurcation 22. In another exemplary embodiment, a portion of the split variable fan exit guide vanes 18S can be adjusted to direct exit airflow 50 toward the downstream object 54, such as the environmental control system inlet 56 at a predetermined gas turbine engine operating condition. The fixed fan exit guide vane 18F can also influence the exit airflow 50 with a predetermined installation pattern angle 42. The variable fan exit guide vane 18V can be adjusted during operation to influence the exit airflow 50 as well.

A control system 58 can be in operative communication with each of the upper actuator 34 and lower actuator 36. The control system 58 may include hardware, firmware, and/or software components that are configured to perform the functions disclosed herein, including the functions of the split variable fan exit guide vane 18S and variable fan exit guide vane 18V. While not specifically shown, the control system 58 may include other computing devices (e.g., servers, mobile computing devices, etc.) and computer aided manufacturer (CAM) systems which may be in communication with each other and/or the control system 58 via a communication network 60 to perform one or more of the disclosed functions. The control system 58 may include at least one processor 62 (e.g., a controller, microprocessor, microcontroller, digital signal processor, etc.), memory 64, and an input/output (I/O) subsystem 66. The control system 58 may be embodied as any type of computing device e.g., a server, an enterprise computer system, a network of computers, a combination of computers and other electronic devices, or other electronic devices. Although not specifically shown, the I/O subsystem 66 typically includes, for example, an I/O controller, a memory controller, and one or more I/O ports. The processor 62 and the I/O subsystem 66 are communicatively coupled to the memory 64. The memory 64 may be embodied as any type of computer memory device (e.g., volatile memory such as various forms of random access memory).

By utilizing the hybrid fan exit guide vane 18 and making individual adjustments to the vane 18V and/or upper section 30 and/or lower section 32, an optimal hybrid variable fan exit guide vane circumferential pattern 68 can be obtained which reduces the residual fan stress by minimizing the circumferential pressure variation sensed by the rotating fan blade 46. An optimal hybrid fan exit guide vane 18 circumferential pattern 68 can also reduce fan 12 stress Harmonic response levels.

A technical advantage of the disclosed hybrid fan exit guide vane includes an increase in system level efficiency resulting in a decrease in thrust specific fuel consumption.

Another technical advantage of the disclosed hybrid fan exit guide vane includes fan efficiency increasing.

Another technical advantage of the disclosed hybrid fan exit guide vane includes decreasing flow loss across the split variable fan exit guide vane and through the bypass duct.

Another technical advantage of the disclosed hybrid fan exit guide vane includes optimization of the back-pressure circumferential distribution by in-flight vanes.

There has been provided a gas turbine engine with hybrid fan exit guide vanes. While the gas turbine engine with hybrid fan exit guide vanes has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A gas turbine engine with hybrid fan exit guide vanes comprising:
   a fan duct supporting a circumferential pattern of hybrid fan exit guide vanes supported within the fan duct downstream from the fan, the hybrid fan exit guide vanes comprising at least one of a fixed fan exit guide vane, a variable fan exit guide vane having a contiguous span in the absence of being split along the contiguous span within the fan duct and a split variable fan exit guide vane, the split variable fan exit guide vanes comprising an upper section and a lower section, the upper section and the lower section each being adjustable about an axis extending along a span of each of the split variable fan exit guide vanes;
   an upper actuator in operative communication with the upper section, the upper actuator configured to independently adjust an incidence angle of the upper section responsive to predetermined gas turbine operating conditions;
   a lower actuator in operative communication with the lower section, the lower actuator configured to independently adjust an incidence angle of the lower section responsive to the predetermined gas turbine operating conditions; and
   one of the upper actuator or the lower actuator in operative communication with the variable fan exit guide vane; wherein each of the fixed fan exit guide vane, the variable fan exit guide vane and the split fan exit guide vane are circumferentially spaced around the circumferential pattern.

2. The gas turbine engine with hybrid fan exit guide vanes according to claim 1, wherein the upper actuator is configured to adjust an installation angle of the upper section from an original predetermined value to another value for each associated split variable fan exit guide vane; and the lower actuator is configured to adjust an installation angle of the lower section from an original predetermined value to another value for each associated split variable fan exit guide vane; and either of the upper actuator or the lower actuator being configured to adjust an installation angle of the variable fan exit guide vane from an original predetermined value to another value for each associated variable fan exit guide vane.

3. The gas turbine engine with hybrid fan exit guide vanes according to claim 1, wherein each of the split variable fan exit guide vanes are divided between the span extending between fan duct walls supporting the split variable fan exit guide vanes; and wherein each of the variable fan exit guide vanes is contiguous along the span extending between fan duct walls supporting the variable fan exit guide vanes.

4. The gas turbine engine with hybrid fan exit guide vanes according to claim 1, wherein each of the individual split variable fan exit guide vanes and each of the variable fan exit guide vanes are configured individually adjustable during operation of the gas turbine engine operation.

5. The gas turbine engine with hybrid fan exit guide vanes according to claim 1, further comprising:
   a controller in operative communication with each of the upper actuator and the lower actuator.

6. The gas turbine engine with hybrid fan exit guide vanes according to claim 1, wherein each of the split variable fan exit guide vanes and the variable fan exit guide vanes are configured adjustable throughout the circumferential pattern.

7. The gas turbine engine with hybrid fan exit guide vanes according to claim 1, wherein each of the split variable fan exit guide vanes and the variable fan exit guide vanes are at least one of adjusted to direct an exit airflow away from a downstream object and adjusted to direct exit airflow toward a downstream object.

8. A gas turbine engine with hybrid fan exit guide vanes comprising:
   a fan located within a fan duct;
   a circumferential pattern of hybrid fan exit guide vanes circumferentially spaced and supported within the fan duct downstream from the fan, the hybrid fan exit guide vanes comprising at least one of a fixed fan exit guide vane, a variable fan exit guide vane being contiguous along an entire span between fan duct walls supporting the variable fan exit guide vane; and a split variable fan exit guide vane comprising an upper section and a lower section, the upper section and the lower section each being adjustable about an axis extending between a span of each of the split variable fan exit guide vanes;
   an upper actuator in operative communication with the upper section, the upper actuator configured to independently adjust an incidence angle of the upper section responsive to predetermined gas turbine operating conditions;
   a lower actuator in operative communication with the lower section, the lower actuator configured to independently adjust an incidence angle of the lower section responsive to the predetermined gas turbine operating conditions; and
   one of the upper actuator or the lower actuator in operative communication with the variable vane; and
   a controller in operative communication with the upper actuator and/or the lower actuator.

9. The gas turbine engine with hybrid fan exit guide vanes according to claim 8, wherein the upper actuator is configured to adjust an installation angle of the upper section from an original predetermined value to another value for each associated split variable fan exit guide vane; and the lower actuator is configured to adjust an installation angle of the lower section from an original predetermined value to another value for an associated split variable fan exit guide vane; and either of the upper actuator or the lower actuator being configured to adjust an installation angle of the variable fan exit guide vane from an original predetermined value to another value for each associated variable fan exit guide vane.

10. The gas turbine engine with hybrid fan exit guide vanes according to claim 8, wherein each of the split variable fan exit guide vanes are divided between the span extending between fan duct walls supporting the split variable fan exit guide vanes; and wherein each of the variable fan exit guide vanes is contiguous in the absence of being split along the span extending between fan duct walls supporting the variable fan exit guide vanes.

11. The gas turbine engine with hybrid fan exit guide vanes according to claim 8, wherein each of the individual split variable fan exit guide vanes and/or the variable fan exit guide vanes are configured individually adjustable during operation of the gas turbine engine operation.

12. The gas turbine engine with hybrid fan exit guide vanes according to claim 8, wherein each of the split variable fan exit guide vanes and/or the variable fan exit guide vanes are configured adjustable throughout the circumferential pattern.

13. The gas turbine engine with hybrid fan exit guide vanes according to claim 8, wherein each of the upper section and lower section of the split variable fan exit guide vanes and the variable fan exit guide vanes can be at least one of adjusted to direct an exit airflow away from a downstream object and adjusted to direct exit airflow toward a downstream object.

14. A process for a gas turbine engine with hybrid fan exit guide vanes comprising:
   supporting a circumferential pattern of hybrid fan exit guide vanes circumferentially spaced apart and supported within the fan duct downstream from the fan, the hybrid fan exit guide vanes comprising at least one of a fixed fan exit guide vane, a variable fan exit guide vane being contiguous along an entire span between fan duct walls supporting the variable fan exit guide vane and a split fan exit guide vane in a fan duct, the split variable fan exit guide vanes comprising an upper section and a lower section;
   configuring the upper section and the lower section adjustable about an axis extending between a span of each of the split variable fan exit guide vanes; and
   coupling an upper actuator in operative communication with the upper section;
   configuring the upper actuator to independently adjust an incidence angle of the upper section responsive to predetermined gas turbine operating conditions;
   coupling a lower actuator in operative communication with the lower section;
   configuring the lower actuator to independently adjust an incidence angle of the lower section responsive to the predetermined gas turbine operating conditions; and
   configuring one of the upper actuator or the lower actuator in operative communication with the variable fan exit guide vane.

15. The process of claim 14, further comprising:
   configuring the upper actuator to adjust an installation angle of the upper section from an original predetermined value to another value for each associated split variable fan exit guide vanes;
   configuring the lower actuator to adjust an installation angle of the lower section from an original predetermined value to another value for each associated split variable fan exit guide vane; and
   configuring at least one of the upper actuator and the lower actuator to adjust an installation angle of the variable fan exit guide vane from an original predetermined value to another value for each associated variable fan exit guide vane.

16. The process of claim 14, further comprising:
   configuring each of the split variable fan exit guide vanes into separate portions between a span extending between fan duct walls supporting the split variable fan exit guide vanes.

17. The process of claim 14, further comprising:
   configuring each of the individual variable fan exit guide vanes and the split variable fan exit guide vanes individually adjustable during operation of the gas turbine engine operation.

18. The process of claim 14, further comprising:
   coupling a controller in operative communication with each of the upper actuator and the lower actuator.

19. The process of claim 14, further comprising:
   configuring each of the variable fan exit guide vanes and the split variable fan exit guide vanes adjustable throughout the entire circumferential pattern.

20. The process of claim 19, further comprising:
   configuring each of the upper section and lower section of the split variable fan exit guide vanes and each variable fan exit guide vane at least one of adjusted to direct an exit airflow away from a downstream object and adjusted to direct exit airflow toward a downstream object.

* * * * *